United States Patent
Park et al.

(10) Patent No.: US 11,935,696 B2
(45) Date of Patent: Mar. 19, 2024

(54) CAPACITOR HAVING INSERT INJECTION-TYPE CASE WITH DUAL MATERIAL OF METAL AND PLASTIC

(71) Applicant: NUINTEK CO LTD, Chungcheongnam-do (KR)

(72) Inventors: Dae-Jin Park, Chungcheongnam-do (KR); Ying-Won Jeon, Chungcheongnam-do (KR); Jin-A Park, Chungcheongnam-do (KR); Hyeon-Jin Kim, Chungcheongnam-do (KR); Taek-Hyeon Lee, Chungcheongnam-do (KR)

(73) Assignee: NUINTEK CO LTD, Chungcheongnam-do (KR)

( * ) Notice: Subject to any disclaimer, the term of this patent is extended or adjusted under 35 U.S.C. 154(b) by 118 days.

(21) Appl. No.: 17/788,816

(22) PCT Filed: Jun. 29, 2021

(86) PCT No.: PCT/KR2021/008160
§ 371 (c)(1),
(2) Date: Jun. 24, 2022

(87) PCT Pub. No.: WO2022/114430
PCT Pub. Date: Jun. 2, 2022

(65) Prior Publication Data
US 2023/0053806 A1 Feb. 23, 2023

(30) Foreign Application Priority Data
Nov. 28, 2020 (KR) .......................... 10-2020-0163419

(51) Int. Cl.
*H01G 2/08* (2006.01)
*H01G 4/224* (2006.01)
(Continued)

(52) U.S. Cl.
CPC ............... *H01G 2/08* (2013.01); *H01G 4/224* (2013.01); *H01G 4/232* (2013.01); *H01G 4/32* (2013.01)

(58) Field of Classification Search
None
See application file for complete search history.

(56) References Cited

U.S. PATENT DOCUMENTS

| 4,580,189 A | * | 4/1986 | Dequasie | ............... H01G 4/224 |
| | | | | 361/275.1 |
| 6,885,538 B1 | * | 4/2005 | Ishii | ....................... H05K 3/301 |
| | | | | 361/308.1 |

FOREIGN PATENT DOCUMENTS

| CN | 106158368 A | * | 11/2016 | |
| JP | 2006196680 A | * | 7/2006 | ............... H01G 2/08 |

(Continued)

OTHER PUBLICATIONS

Translation KR-20190069963 (Year: 2019).*
International Search Report from corresponding PCT Application No. PCT/KR2021/008160, dated Oct. 20, 2021.

*Primary Examiner* — Eric W Thomas
(74) *Attorney, Agent, or Firm* — Harness, Dickey & Pierce, P.L.C.

(57) ABSTRACT

A capacitor includes a capacitor module including a capacitor device, a first busbar electrically connected with a thermally-sprayed surface of the capacitor device and having a first lead terminal on an exposed side, a second busbar electrically connected with the other thermally-sprayed surface of the capacitor device and having a second lead terminal on an exposed side, and an insulating sheet disposed between the first busbar and the second busbar to insulate an overlap region; a plastic case having a 3D space formed by four sides and a bottom to accommodate the capacitor module and having an open top; a metallic external (Continued)

wall is formed outside one side of the four sides or the bottom of the plastic case; and a filler permeating in a gel or fluid state into the space between the capacitor module and inner walls of the plastic case.

5 Claims, 6 Drawing Sheets

(51) Int. Cl.
*H01G 4/232* (2006.01)
*H01G 4/32* (2006.01)

(56) References Cited

FOREIGN PATENT DOCUMENTS

| | | |
|---|---|---|
| KR | 10-2011-0086385 A | 7/2011 |
| KR | 10-2015-0080399 A | 7/2015 |
| KR | 10-2016-0062447 A | 6/2016 |
| KR | 10-2017-0034956 A | 3/2017 |
| KR | 10-2019-0069963 A | 6/2019 |

* cited by examiner

CAPACITOR HAVING INSERT INJECTION-TYPE CASE WITH DUAL MATERIAL OF METAL AND PLASTIC

CROSS-REFERENCE TO RELATED APPLICATIONS

This application is a national phase application of PCT Application No. PCT/KR2021/008160, filed on 29 Jun. 2021, which claims priority to Korean Patent Application No. 10-2020-0163419, filed on 28 Nov. 2020. The entire disclosures of the applications identified in this paragraph are incorporated herein by references.

TECHNICAL FIELD

The present disclosure relates to a capacitor with an insert injection metal-plastic dual-material case.

DESCRIPTION OF THE RELATED ART

In general, film capacitors are generally used in various industrial fields, and for example, a capacitor for electric devices, a low-voltage power capacitor, a capacitor for an inverter, a capacitor for a filter, etc. are well known.

In order to manufacture these capacitors, a dielectric film (or also called a plastic film) such as polyester (PET) resin, polypropylene (PP) resin, polyethylene naphthalene (PEN) resin, polycarbonate (PC) resin, polyphenylene sulfide (PPS) resin is used as a dielectric, and a deposited film formed by depositing zinc, aluminum, or an aluminum alloy or primarily depositing aluminum and then secondarily using zinc, etc. on one side or both sides of a dielectric film is used as an electrode.

A film capacitor is manufactured by winding two sheets of deposited films making a pair. In order to use both sides of a wound capacitor device for leading electrodes, thermally-sprayed surfaces are formed by thermally spraying zinc or a zinc alloy to both sides of the capacitor device, busbars, electrode leads, or electrode terminals are coupled to the thermally-sprayed surfaces through spotting, solder, etc., the capacitor device is inserted into an external case, and then an insulator such as epoxy or urethane is put into the external case and then cured, whereby the capacitor device can be manufactured as a case mold type capacitor.

The plastic cases of existing capacitors have a defect that heat generated in the capacitors is not discharged outside, so the internal temperature of the capacitors greatly increases. In order to solve this problem, metal cases that discharge heat well have been developed and used. However, there is a defect that although the capacity and volume of a capacitor are considerably decreased due to excellent heat dissipation, the metal cases are heavy and the material cost is increased in manufacturing to insulate the inside of the capacitor.

When the portion that presses an inverter power element IGBT for a vehicle is made of metal, there are advantages, but there is a problem that when a metal plate is attached to a plastic case using an adhesion or insert injection is applied, the plastic case and the metal plate are not attached well and separated. Further, they look like attached well, but there is a problem when they are fastened to a capacitor mount by bolts, the metal plate is dropped with a thud.

SUMMARY OF THE INVENTION

An objective of the present disclosure is to provide a capacitor with an insert injection metal-plastic dual-material case that can improve heat dissipation performance by applying a metal case to an IGBT contact portion required to dissipation a large amount of heat and that can maintain insulation between a case and a capacitor module including a capacitor element and a metallicon busbar by applying a plastic material to the inside and other outer surfaces.

Another objective of the present disclosure is to provide a capacitor with an integrated insert injection metal-plastic dual-material case that improves thermal conductivity without damaging a mount portion by being strongly coupled to an IGBT unit or an IGBT cooling unit on an inverter circuit (a motor driving circuit for an electric vehicle). Accordingly, problems such as breakage of a fastened portion due to a bolting force and a poor quality due to strong vibration in a metal-plastic assembly type dual-material case of the related art can be solved.

Another objective of the present disclosure is to provide a capacitor with an insert injection metal-plastic dual-material case that can reduce a manufacturing cost because a metal case part, which can be machined in precise dimensions, can come into direct contact with an IGBT cooling unit and accordingly a thermal pad used in the related art is not needed.

A capacitor with insert-injected metal-plastic dual-material case of the present disclosure includes: a capacitor module (10) including a capacitor device (C) formed by winding a dielectric film and having thermally-sprayed surfaces on both sides, a first busbar electrically connected with a thermally-sprayed surface of the capacitor device and having a first lead terminal (1) on an exposed side, a second busbar electrically connected with the other thermally-sprayed surface of the capacitor device (C) and having a second lead terminal (2) on an exposed side, and an insulating sheet disposed between the first busbar and the second busbar to insulate an overlap region; a plastic case (20) having a 3D space formed by four sides and a bottom to accommodate the capacitor module and having an open top (29a); a metallic external wall (30) is formed outside one side of the four sides or the bottom of the plastic case (20); and a filler (40) permeating in a gel or fluid state into the space between the capacitor module and inner walls of the plastic case (20), and then hardened therein, thereby filling up the space, in which an inner wall (20a) of the plastic case (20) that is in contact with the metallic external wall (30) forms one dual-material wall (50).

In the capacitor with an insert injection metal-plastic dual-material case of the present disclosure, it is preferable that the metallic external wall (30) and the plastic case (20) are integrated through insert injection. It is preferable that the metallic external wall (30) has a plastic filling hole having a wide outer side and a narrow inner side, and the plastic case inner wall (20a) includes expanding protrusions (21, 21a) formed by filling the first filling hole with plastic resin and having an inside-narrow and outside-wide shape of which the width increases outward from the inside.

According to the present disclosure, there is provided a capacitor with an insert injection metal-plastic dual-material case that can improve heat dissipation performance by applying a metal case to an IGBT contact portion required to dissipation a large amount of heat and that can maintain insulation between a case and a capacitor module including a capacitor element and a metallicon busbar by applying a plastic material to the inside and other outer surfaces.

Further, there is provided a capacitor with an integrated insert-injected metal-plastic dual-material case that improves thermal conductivity without damaging a mount portion by being strongly coupled to an IGBT unit or an IGBT cooling unit on an inverter circuit (a motor driving circuit for an electric vehicle). Accordingly, problems such as breakage of a fastened portion due to a bolting force and a poor quality due to strong vibration in a metal-plastic assembly type dual-material case of the related art are solved.

Further, there is provided a capacitor with an insert-injected metal-plastic dual-material case that can reduce a manufacturing cost because a metal case part, which can be machined in precise dimensions, can come into direct contact with an IGBT cooling unit and accordingly a thermal pad used in the related art is not needed.

DETAILED DESCRIPTION OF THE INVENTION

Figure 1A:
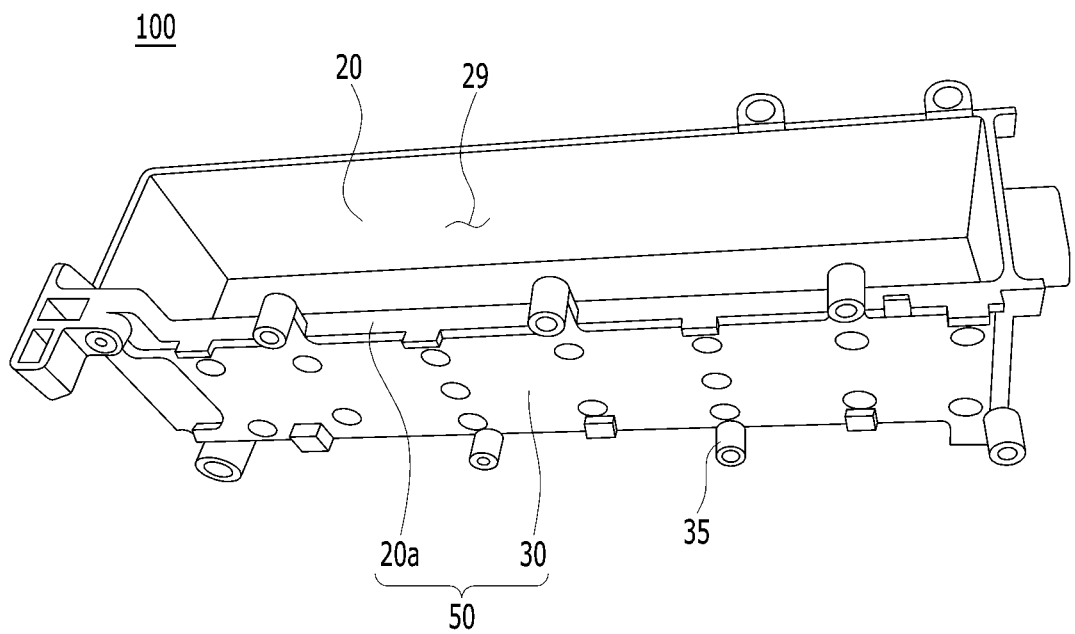
FIGS. 1a and 1b are entire configuration views of a capacitor with an insert injection metal-plastic dual-material case according to an embodiment of the present disclosure.

A capacitor with insert-injected metal-plastic dual-material case of the present disclosure includes: a capacitor module 10 including a capacitor device C formed by winding a dielectric film and having thermally-sprayed surfaces on both sides, a first busbar electrically connected with a thermally-sprayed surface of the capacitor device and having a first lead terminal 1 on an exposed side, a second busbar electrically connected with the other thermally-sprayed surface of the capacitor device C and having a second lead terminal 2 on an exposed side, and an insulating sheet disposed between the first busbar and the second busbar to insulate an overlap region; a plastic case 20 having a 3D space formed by four sides and a bottom to accommodate the capacitor module and having an open top 29a; a metallic external wall 30 is formed outside one side of the four sides or the bottom of the plastic case 20; and a filler 40 permeating in a gel or fluid state into the space between the capacitor module and inner walls of the plastic case 20, and then hardened therein, thereby filling up the space, in which an inner wall 20a of the plastic case 20 that is in contact with the metallic external wall 30 forms one dual-material wall 50.

In the capacitor with an insert injection metal-plastic dual-material case of the present disclosure, it is preferable that the metallic external wall 30 and the plastic case 20 are integrated through insert injection. It is preferable that the metallic external wall 30 has a plastic filling hole having a wide outer side and a narrow inner side, and the plastic case inner wall 20a includes expanding protrusions 21 and 21a formed by filling the first filling hole with plastic resin and having an inside-narrow and outside-wide shape of which the width increases outward from the inside.

Figure 1B:
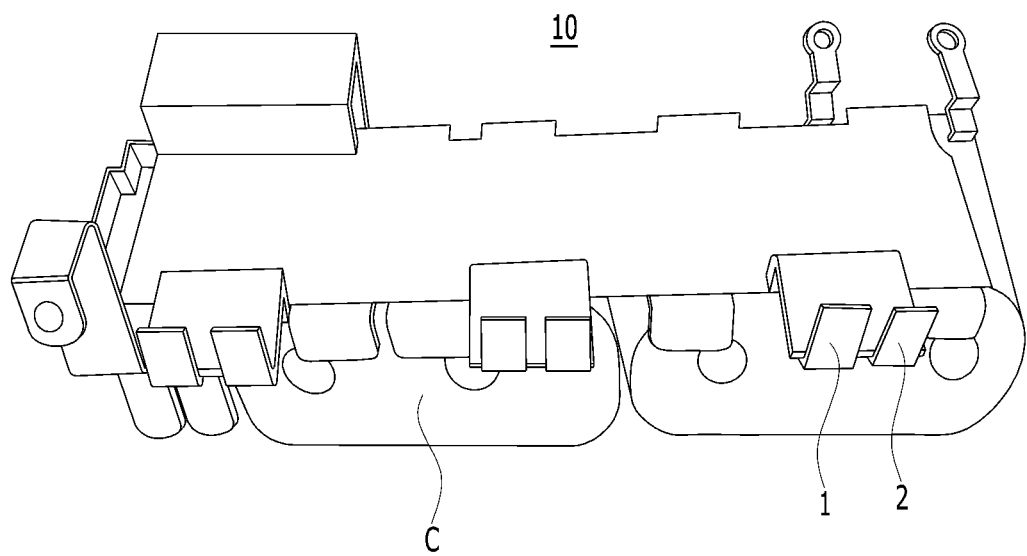

Hereafter, a capacitor with an insert injection metal-plastic dual-material case according to an embodiment of the present disclosure is described in detail with reference to the accompanying drawings. FIG. 1 is an entire configuration view of a capacitor with an insert injection metal-plastic dual-material case according to an embodiment of the present disclosure, FIGS. 2 and 3 are detailed view of the insert injection metal-plastic dual-material case according to an embodiment of the present disclosure, and FIG. 4 is a view showing a use state of the capacitor with an insert injection metal-plastic dual-material case according to an embodiment of the present disclosure.

As shown in FIGS. 1 to 4, a capacitor with an insert injection metal-plastic dual-material case according to an embodiment of the present disclosure includes a capacitor module 10, a plastic case 20, a metallic external wall 30, and a filler 40.

As shown in FIG. 1, the capacitor module 10 includes: a capacitor device C formed by winding a dielectric film and having thermally-sprayed surfaces on both sides, a first busbar electrically connected with a thermally-sprayed surface of the capacitor device and having a first lead terminal 1 on an exposed side, a second busbar electrically connected with the other thermally-sprayed surface of the capacitor device C and having a second lead terminal 2 on an exposed side, and an insulating sheet disposed between the first busbar and the second busbar to insulate an overlap region.

Figure 2:
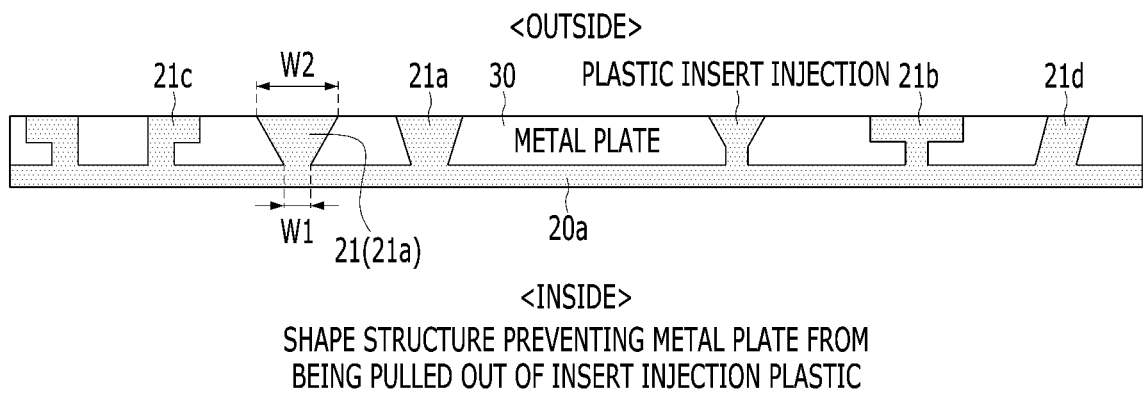
FIGS. 2 and 3 are detailed view of the insert injection metal-plastic dual-material case according to an embodiment of the present disclosure.
Figure 3:
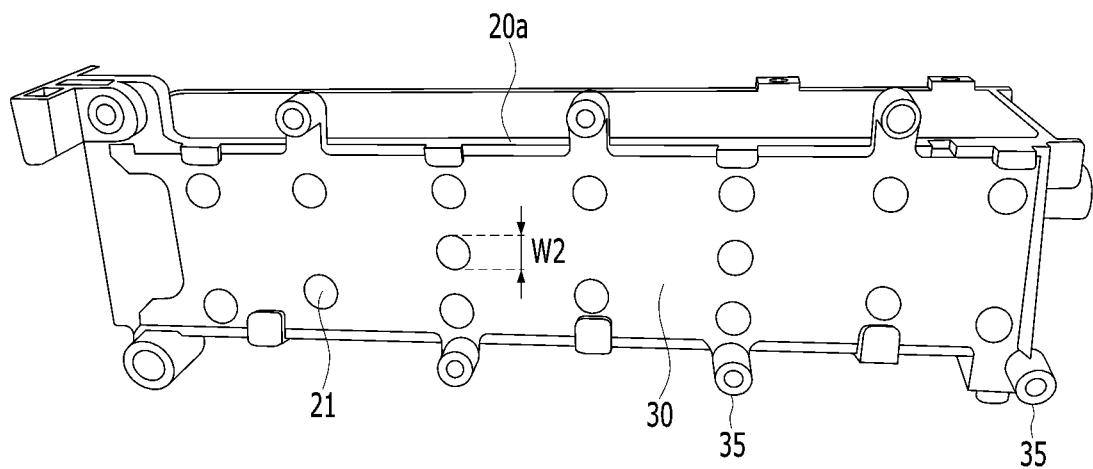
Figure 4:
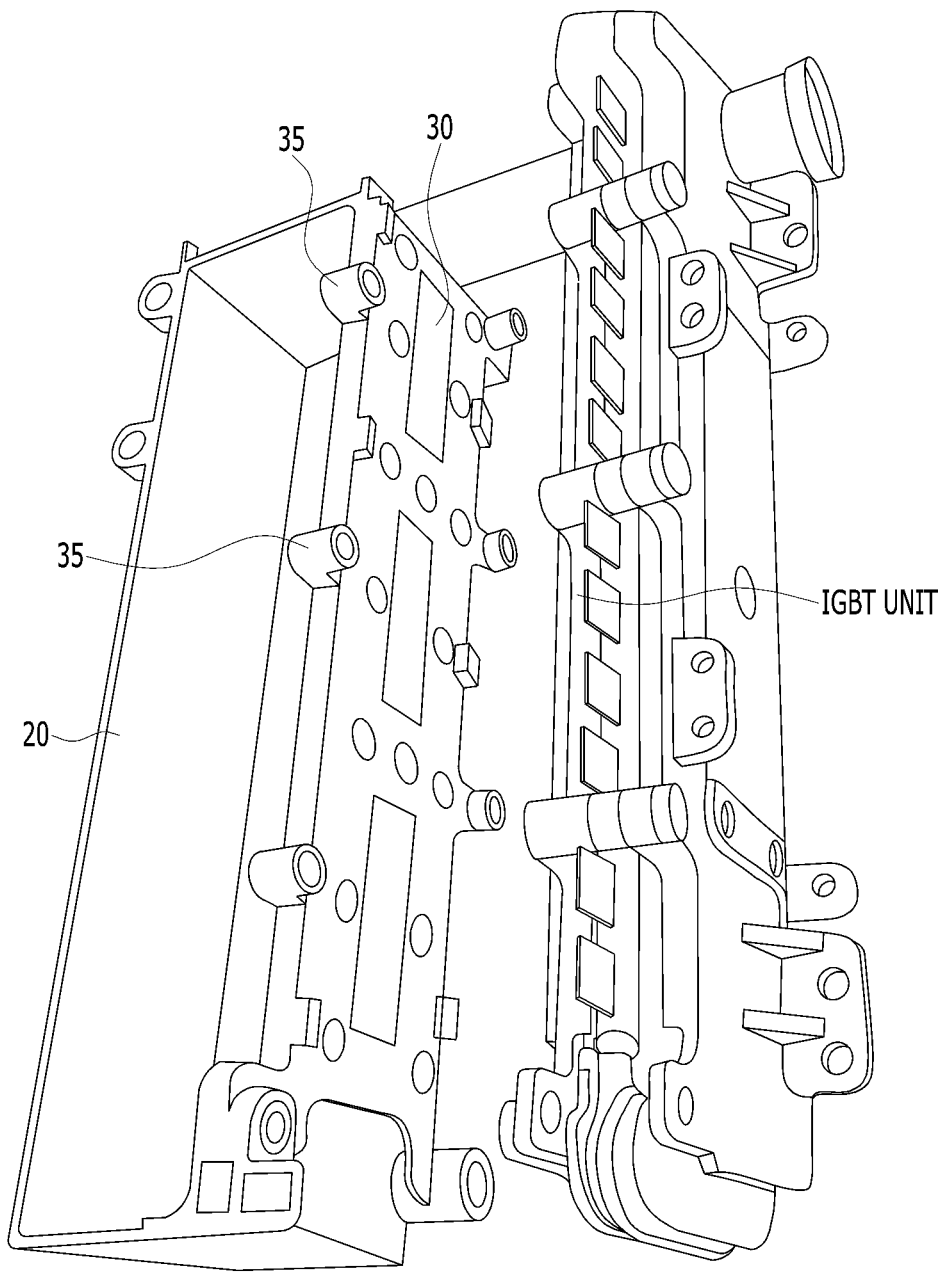
FIG. 4 is a view showing a use state of the capacitor with an insert injection metal-plastic dual-material case according to an embodiment of the present disclosure.
Figure 5:
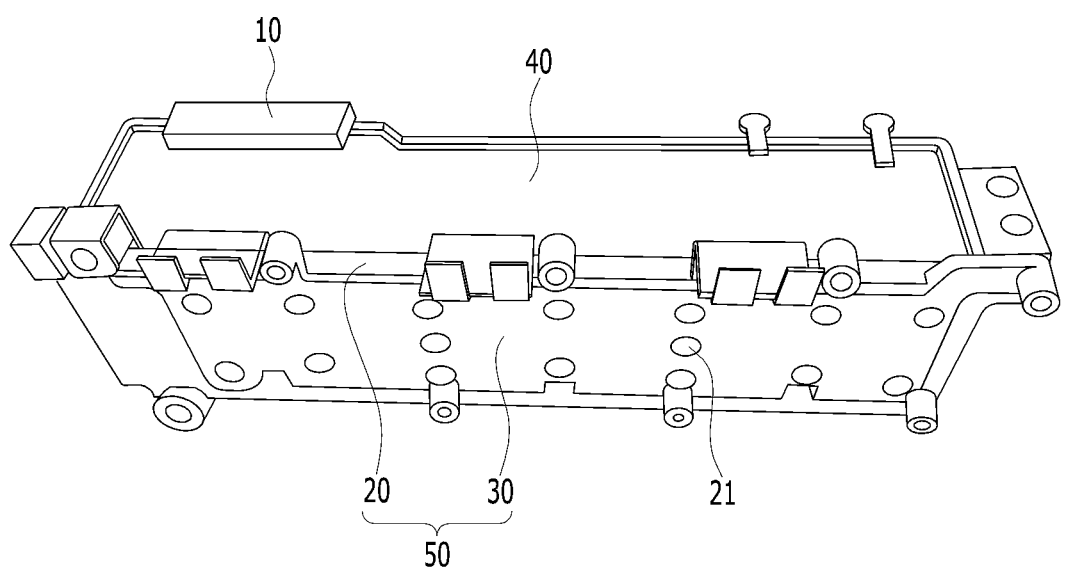
FIG. 5 is an assembly view of the capacitor with an insert injection metal-plastic dual-material case according to an embodiment of the present disclosure.
Figure 6:
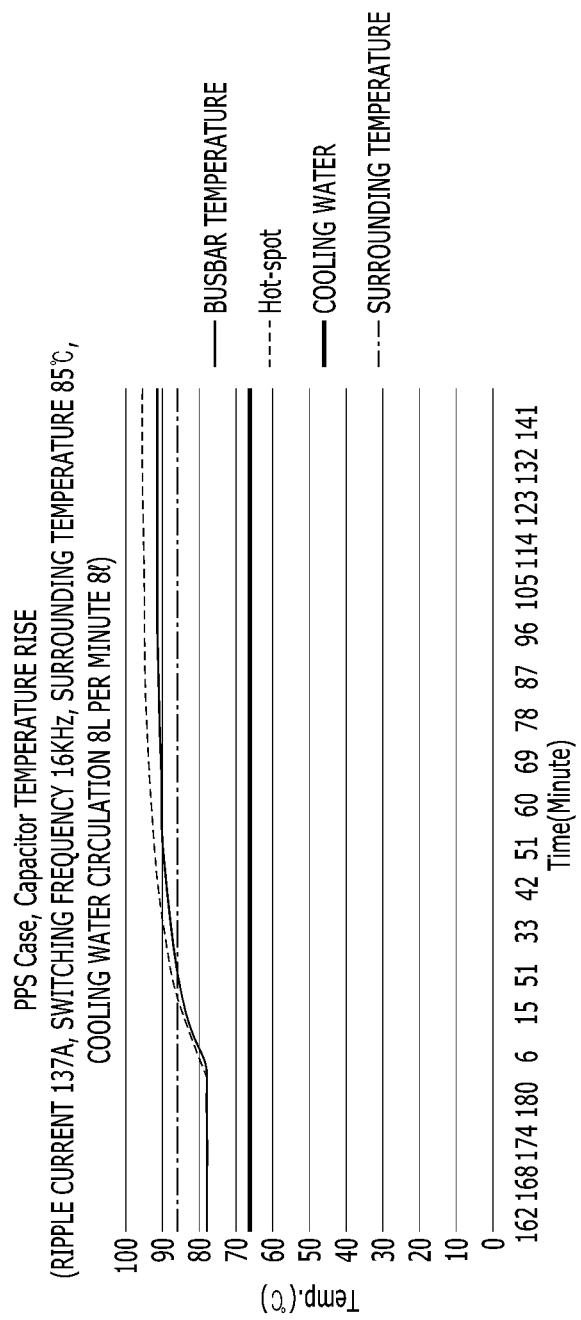
FIGS. 6 and 7 are views performance test assembly views of the capacitor with an insert injection metal-plastic dual-material case according to an embodiment of the present disclosure.
Figure 7:
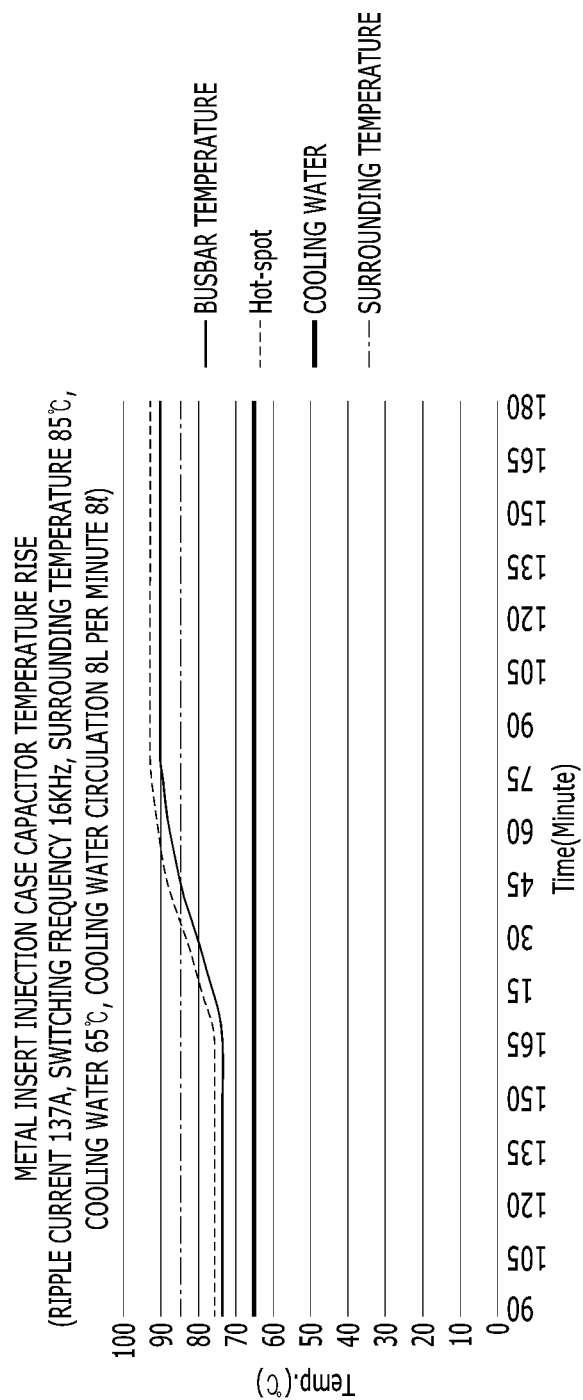

As shown in FIGS. 1 to 3, the plastic case 20 of the present disclosure has a 3D space formed by four sides and a bottom to accommodate the capacitor module and has an open top 29a. The metallic external wall 30 is formed outside one side of the four sides or the bottom of the plastic case 20.

As shown in FIGS. 1 to 4, the filler 40 permeates in a gel or fluid state into the space between the capacitor module and the inner walls of the plastic case 20, and is then hardened therein, thereby filling up the space. An inner wall 20a of the plastic case 20 that is in contact with the metallic external wall 30 forms one dual-material wall 50. The metallic external wall 30 and the plastic case 20 are integrated through insert injection.

As shown in FIG. 2, the metallic external wall 30 may have a plastic filling hole having a wide outer side and a narrow inner side, and the plastic case inner wall 20a includes expanding protrusions 21 and 21a formed by filling the first filling hole with plastic resin and having an inside-narrow and outside-wide shape of which the width increases outward from the inside.

As shown in FIGS. 2 and 3, the metallic external wall 30 may have a T-shaped second filing hole of which the outer side has a large width and the inner side has a small width, and the plastic case inner wall 20a may include a T-shaped second expanding protrusion 21b that is formed by filling the second filling hole with plastic resin and of which the outer side has a large width and the inner wide has a small width.

Alternatively, the metallic external wall 30 may have an L-shaped third filling hole extending and bending outward from the inside, and the plastic case inner wall 20a may include an L-shaped third protrusion 21c formed by filling the third filling hole with plastic resin and extending and bending outward from the inside.

Alternatively, the metallic external wall 30 may have a fourth filling hole inclined outward from the inside, and the plastic case inner wall 20a may include a fourth protrusion 21c formed by filling the fourth filling hole with plastic resin and inclined outward from the inside.

As shown in FIG. 4, the outer wall of the metallic external wall 30 is coupled in a contact state to an IGBT cooling unit on an inverter circuit for an electric vehicle, and a plurality of coupling spiral portions 35 protrudes outward from the edge of the metallic external wall 30 to be coupled to the IGBT cooling unit. The coupling spiral portions 35 are strongly bolted to the IGBT cooling unit, thereby increasing heat transfer.

As shown in FIGS. 1, 2, and 3, in the capacitor with an insert injection metal-plastic dual-material case of the present disclosure, the protrusion 21 made of plastic resin that is the same as the material of the plastic case inner wall 20a is formed in an inside-wide and outside-narrow shape by filing a groove of the metallic external wall 30 in insert injection molding. As shown in the figures, it is preferable that four to forty protrusions are formed with regular intervals. It could be seen that this case is advantageous in terms of securing appropriate rigidity, securing sufficient metal heat transfer area, and fluidity of resin in injection molding.

In the capacitor with an insert injection metal-plastic dual-material case of the present disclosure, it is preferable that the entire cross-sectional area of the inner sides of the protrusions, that is, the narrow portions is 1/50-1/5 of the entire area of the metallic external wall 30. When it is less than 1/50, breakage may be generated at the narrow portions due to vibration or coupling reaction force of the IGBT or the metallic case, and when it exceeds 1/5, heat transfer efficiency decreases, so it could be seen that the above-mentioned range is preferable.

In the capacitor with an insert injection metal-plastic dual-material case of the present disclosure, it could be seen that the rigidity of the protrusions and the locking effect of the expanding portions were excellent when the width W1 of the inner sides, that is, the narrow portions of the protrusions 21 was 0.2-3 cm and the width W2 of the outer sides, that is, the wide portions of the protrusions 21 was 0.21-4 cm.

The configuration and operation of the present disclosure are expatiated. A metal plate is made of aluminum, steel, copper, nonferrous metal, etc. An aluminum die casting mold was manufactured, aluminum was injection-molded, a surface pressing an inverter power element IGBT was machined to have high flatness, and a hole (filling hole), in which once plastic is inserted and hardened in injection, the plastic is never pulled out, was machined in the metal plate to compensate for the defect that a plastic interface is easily separated in insert injection.

An injection mold is manufactured to insert-inject a metal plate in an injection case mold and mounted on an injection machine and the metal plate is put in the injection mold and injected, thereby achieving an advantageous effect that once the metal plate hole is filled with plastic resin and the plastic resin hardens therein, the plastic resin is never pulled, and cracks or gaps are not formed.

<Test result>

1) The capacitor of an inverter housing was assembled and then a M6 bolt was strongly fastened to a capacitor mount ((100Kg.f/cd), but harmful phenomenon such as cracks, breaking, and gaps was not generated. Further, all of the capacitors passed vibration and thermal shock tests by Hyundai Motor Company.

2) Since the inner side of the insert injection case of the metal plate was made of plastic, specific insulation treatment was not required for the inner side against P and N electrodes composed of the case and a capacitor module.

3) As the result of a temperature rise test, a temperature rise was smaller and excellent than an All plastic case and was larger than a metal case.

TABLE 1

| Items | Existing All plastic case capacitor | All metal case capacitor | Metal plate insert injection case capacitor only for portion pressing IGBT |
|---|---|---|---|
| Temperature rise test Hotspot Temp. (° C.) | 97.7 | 84.7 | 92 |

<Economic effect>

Existing plastic capacitor inverter assembly order: inverter heat sink+IGBT+metal plate+thermal pad+plastic case capacitor All metal case capacitor inverter assembly order: inverter heat sink+IGBT+heat sink+All metal case capacitor Metal plate insert injection case capacitor assembly order: inverter heat sink+IGBT+heat sink+metal plate insert injection case capacitor Injection plastic case capacitor of the present disclosure The capacitor of the metal plate insert injection plastic case shows an excellent cooling effect only at the portion pressing the IGBT at the metal insert-injected portion, so a temperature rise is smaller than the existing All plastic capacitor. Further, a metal plate pressing the IGBT and a thermal pad are not used, and the material cost and working processes are reduced, whereby a manufacturing cost reduction effect is high.

<Heat dissipation characteristic>

1) Comparison of thermal conductivity

PPS thermal conductivity is 0.359Wm^-1C^-1 and the thermal conductivity of an aluminum case is 92Wm^-1C^-1.

When the material of a case is aluminum, the thermal conductivity is very high, so the effect of dissipating internal heat is high. Accordingly, it is determined that heat generation is low in a temperature rise test of an aluminum case capacitor.

2) Since an aluminum plate insert injection case was used, ΔT was about 5.7° C. lower, so the capacity and volume of the capacitor could be decreased as follows.

TABLE 2

|  | Existing product | Product after improvement | Reduction ratio (%) |
| --- | --- | --- | --- |
| Capacity (uF) | 702 | 650 | −7.4% |
| Volume (l) | 0.590 | 0.556 | −5.8% |
| Busbar thickness (mm) | 2 | 1 | −50.0% |

Although the present disclosure was described with reference to the preferable embodiments described above, the scope of the present disclosure is not limited thereto, is determined by the following claims, and may include various changes and modifications in the equivalent range of the present disclosure.

It should be noted that the reference numerals in the following claims are provided only to help understand the present disclosure without influencing construction of the right range and the right range should not be construed narrowly on the basis of the reference numerals.

According to the present disclosure, there is provided a capacitor with an insert injection metal-plastic dual-material case that can improve heat dissipation performance by applying a metal case to an IGBT contact portion required to dissipation a large amount of heat and that can maintain insulation between a case and a capacitor module including a capacitor element and a metallicon busbar by applying a plastic material to the inside and other outer surfaces.

What is claimed is:

1. A capacitor with an insert injection metal-plastic dual-material case, the capacitor comprising:

a capacitor module including a capacitor device formed by winding a dielectric film and having thermally-sprayed surfaces on both sides, a first busbar electrically connected with a thermally-sprayed surface of the capacitor device and having a first lead terminal on an exposed side, a second busbar electrically connected with the other thermally-sprayed surface of the capacitor device and having a second lead terminal on an exposed side, and an insulating sheet disposed between the first busbar and the second busbar to insulate an overlap region;

a plastic case having a 3D space formed by four sides and a bottom to accommodate the capacitor module and having an open top;

a metallic external wall is formed outside one side of the four sides or the bottom of the plastic case; and a filler permeating in a gel or fluid state into the space between the capacitor module and inner walls of the plastic case, and then hardened therein, thereby filling up the space, wherein an inner wall of the plastic case that is in contact with the metallic external wall forms one dual-material wall, wherein the metallic external wall and the plastic case are integrated through insert injection, and wherein the metallic external wall has a plastic filling hole having a wide outer side and a narrow inner side, and the plastic case inner wall includes expanding protrusions formed by filling the first filling hole with plastic resin and having an inside-narrow and outside-wide shape of which the width increases outward from the inside.

2. The capacitor of claim 1, wherein the metallic external wall has a T-shaped second filing hole of which the outer side has a large width and the inner side has a small width, and the plastic case inner wall includes a T-shaped second expanding protrusion that is formed by filling the second filling hole with plastic resin and of which the outer side has a large width and the inner wide has a small width, or the metallic external wall has an L-shaped third filling hole extending and bending outward from the inside, and the plastic case inner wall includes an L-shaped third protrusion formed by filling the third filling hole with plastic resin and extending and bending outward from the inside, or the metallic external wall has a fourth filling hole inclined outward from the inside, and the plastic case inner wall includes a fourth protrusion formed by filling the fourth filling hole with plastic resin and inclined outward from the inside.

3. The capacitor of claim 1, wherein an outer wall of the metallic external wall is coupled in a contact state to an IGBT cooling unit on an inverter circuit for an electric vehicle, and a plurality of coupling spiral portions protrudes outward from the edge of the metallic external wall to be coupled to the IGBT cooling unit.

4. The capacitor of claim 1, wherein a protrusion made of plastic resin that is the same as the material of the plastic case inner wall is formed in an inside-wide and outside-narrow shape by filing a groove of the metallic external wall in insert injection molding, and four to forty of the protrusions are formed with regular intervals.

5. The capacitor of claim 4, wherein the entire cross-sectional area of the inner sides of the protrusions is 1/50-1/5 of the entire area of the metallic external wall, and
a width of the inner sides is 0.2-3 cm and a width of the outer sides is 0.21-4 cm.

* * * * *